US010895272B2

(12) United States Patent
Lucidera et al.

(10) Patent No.: US 10,895,272 B2
(45) Date of Patent: Jan. 19, 2021

(54) SOLENOID VALVE ISLAND

(71) Applicant: METAL WORK S.p.A, Concesio (IT)

(72) Inventors: Marco Lucidera, Concesio (IT);
Jacopo Marconi, Brescia (IT)

(73) Assignee: METAL WORK S.P.A., Concesio (IT)

( * ) Notice: Subject to any disclaimer, the term of this patent is extended or adjusted under 35 U.S.C. 154(b) by 32 days.

(21) Appl. No.: 16/274,807

(22) Filed: Feb. 13, 2019

(65) Prior Publication Data
US 2019/0264712 A1 Aug. 29, 2019

(30) Foreign Application Priority Data

Feb. 27, 2018 (IT) .......................... 202018000001985

(51) Int. Cl.
F15B 13/08 (2006.01)
F16K 27/00 (2006.01)
F15B 13/044 (2006.01)
F15B 13/04 (2006.01)

(52) U.S. Cl.
CPC ...... F15B 13/0878 (2013.01); F15B 13/0401 (2013.01); F15B 13/044 (2013.01); F15B 13/0817 (2013.01); F15B 13/0857 (2013.01); F16K 27/003 (2013.01); Y10T 137/87885 (2015.04)

(58) Field of Classification Search
CPC ........... F16K 27/003; Y10T 137/87885; F15B 13/0878; F15B 13/0857; F15B 13/044; F15B 13/0401; F15B 13/0817
See application file for complete search history.

(56) References Cited

U.S. PATENT DOCUMENTS

| 7,204,273 B1* | 4/2007 | Zub et al. | ........... F15B 13/0814 137/884 |
| 10,400,908 B2* | 9/2019 | Lucidera | ............. F16K 11/0708 |
| 2009/0212247 A1* | 8/2009 | Inaba et al. | ......... F15B 13/0839 251/129.15 |

FOREIGN PATENT DOCUMENTS

| WO | 2017017650 A1 | 7/2016 |
| WO | 2017017653 A1 | 2/2017 |
| WO | 2017017656 A1 | 2/2017 |

* cited by examiner

Primary Examiner — Kevin L Lee
(74) Attorney, Agent, or Firm — Cantor Colburn LLP

(57) ABSTRACT

A solenoid valve island having a base body that includes a housing for a respective solenoid valve, a main feeding duct that is in fluid communication with the housing to supply compressed air entering the solenoid valve and that is provided with an inlet mouth for connection with a source of compressed air, a main collection duct in fluid communication with the housing to collect air leaving the solenoid valve and a discharge mouth for discharging the collected air, a hollow seat in which an electric or electronic supply and control circuit of the solenoid valve is housed and includes an opening at each housing for the electric connection, through it, of the respective solenoid valve with the electric or electronic supply and control circuit, where the electric or electronic supply and control circuit has a male or female type power supply and signal transmitting connector that is partially housed in the hollow seat of the base body and that can be coupled with a corresponding end connector of a cable for the connection of the electric or electronic supply and control circuit to a remote supply and control unit, the corresponding end connector being respectively female or male.

11 Claims, 9 Drawing Sheets

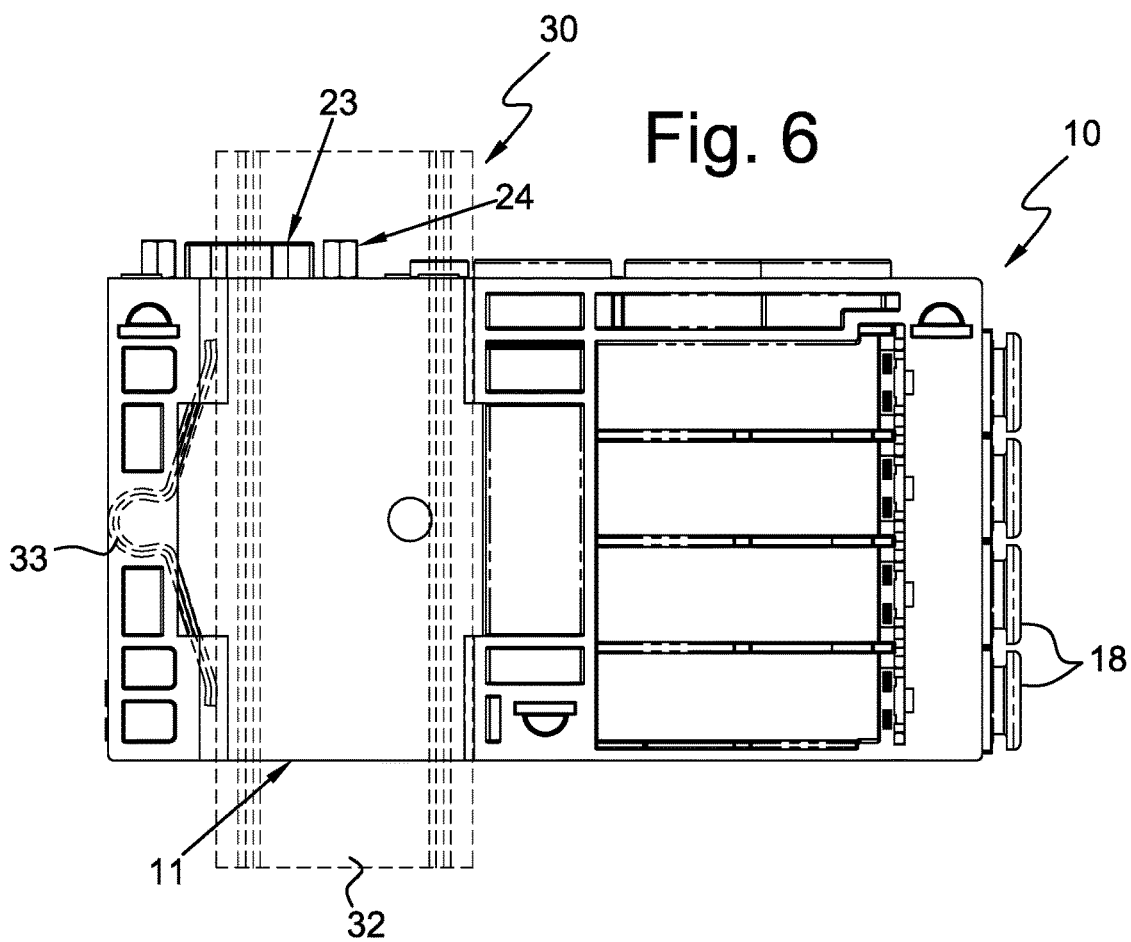
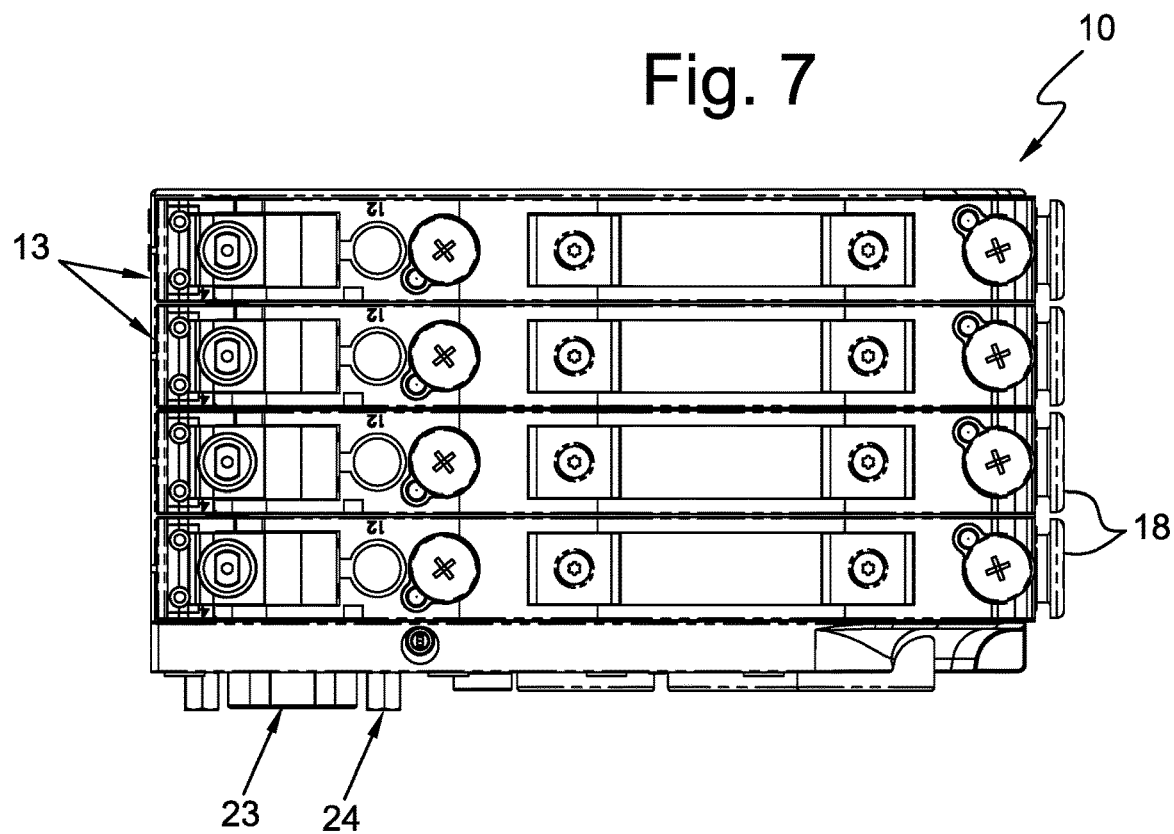

SOLENOID VALVE ISLAND

CROSS REFERENCE TO RELATED APPLICATION

This application is related to and claims the benefit of Italian Patent Application Number 202018000001985 filed on Feb. 27, 2018, the contents of which are incorporated herein by reference in their entirety.

TECHNICAL FIELD

The present disclosure relates to a solenoid valve island.

BACKGROUND

There are known solenoid valve systems or solenoid valve islands that comprise one or more solenoid valves assembled on one or more bases connected to one another to form an assembly, which assembly is in turn connected to at least one head element or module.

The known solenoid valve systems or islands may be of the modular type or of the non-modular type.

The known solenoid valve systems or islands of modular type comprise:
  one or more solenoid valves,
  one or more modular type bases that are removably fixed to one another,
  at least one head element or module removably connected and fixed to an end of the base or of the assembly of bases and in which the electrical connections and the pneumatic connections are obtained,
  an end element arranged at the end of the base opposite to the one connected to the head element.

Each solenoid valve generally is of the type of a spool distributor contained in a box-like casing; a same box-like casing may also contain two separate spool distributors.

Each base comprises a base body in which one or more housings are obtained, each of which is configured to receive a respective solenoid valve. Each housing is provided with ducts for the passage of the fluid under pressure that are connected with the corresponding mouths of the respective solenoid valve. In particular, each housing made in the base is provided with: at least one feeding duct, at least one outlet or delivery duct and at least one discharge duct, which are connected respectively with the at least one feeding mouth, the at least one usage or outlet mouth and the at least one discharge mouth of the respective solenoid valve.

Main feeding and collection ducts of the fluid under pressure are also obtained in the base, which join in fluid communication with each housing, respectively with the at least one feeding duct and with the at least one discharge duct of each housing.

The at least one outlet or delivery duct of each housing of the base instead is separate from the outlet or delivery ducts of the remaining housings obtained in the base and leads into a respective delivery opening that is accessible from the outside of the base and that can be connected to a respective slave utility (for example, a pneumatic actuator) to the corresponding solenoid valve.

The base is then provided with an electric or electronic supply and control circuit (for example, supported by a board); such circuit is provided with contacts that branch off at a respective opening made in each housing to allow the electrical connection of the circuit with the actuation and/or electrical or electrical-pneumatic repositioning devices of each solenoid valve.

Each solenoid valve is removably fixed to the base with fixing members of known type, for example of the screw type.

The bases are generally coupled to one another and are removably fixed with fixing members of known type, such as for example rods.

The head element or module comprises a body in which there are obtained:
  at least one first joining duct that connects to the at least one main feeding duct of the base at one end and that can be joined with a source of fluid under pressure at the opposite end,
  at least one second joining duct that connects to the at least one main discharge duct of the base at one end and that leads to a discharge opening at the opposite end,
  an electric or electronic input module provided with an input connector that can be connected with a corresponding end connector of a connection cable with a remote supply and control unit, and an output connector that can be connected to the corresponding input connector of the electric or electronic circuit of the base.

If the base is of the modular type, each base module comprises an input connector and an output connector that can be coupled respectively with the output connector of the preceding head element or base module and with the input connector of the successive base module for the transmission of the control signals from the electric or electronic input module to the electric or electronic circuits of the various base modules.

The head element or module may in turn comprises two bodies: a first body in which the pneumatic connections (first and second joining duct) are obtained and a second body in which the electrical connections (input connector and output connector) are obtained.

Known solenoid valve systems are for example described in WO2017/017650A1, WO2017/017653A1 and WO2017/017656A1.

The known solenoid valve systems or islands of non-modular type comprise:
  one or more solenoid valves,
  a single base in which one or more housings are obtained, each of which is adapted to receive a respective solenoid valve, and the main feeding and collection/discharge ducts that join in fluid communication with each housing and that are provided with the pneumatic connections for the direct connection respectively with a feeding source of the fluid under pressure and with a discharge of the fluid,
  an electrical connection element or module that is removably fixed on the base or beside it and in which the electrical connections are obtained, and possibly also the solenoid valve supply and control circuit, should it not be housed in the base itself.

The electrical connections, in particular the input connector adapted to be connected with the corresponding end connector of a connection cable with a remote supply and control unit, in the known solenoid valve islands—whether they are of the modular or non-modular type—is supported by an element or module that is separate from the base and that is removably coupled to the latter, at the head thereof, on it or beside it.

Making the electrical connections in an electric connection element or module that is separate from the bases results in an increase of the production costs of the known solenoid valve islands.

The presence of such an electrical connection element or module that is separate from the bases also results in a complication of the assembly and disassembly operations of the solenoid valve islands, in addition to resulting in an increase of the overall dimensions thereof.

BRIEF SUMMARY

The disclosure provides a solenoid valve island that overcomes the drawbacks of the known technique.

The disclosure further provides a solenoid valve island that has contained overall dimensions.

The disclosure also provides a solenoid valve island that has limited production costs.

The disclosure further provides a solenoid valve island that allows simplifying the assembly and disassembly operations.

BRIEF DESCRIPTION OF THE DRAWINGS

The characteristics and advantages of a solenoid valve island according to the present disclosure will be more apparent from the following description, which is to be understood as exemplifying and not limiting, with reference to the schematic attached drawings, wherein:

FIGS. 6 and 7 are plan views, respectively bottom and top views, of the solenoid valve island in FIG. 1;

DETAILED DESCRIPTION

Figure 1:
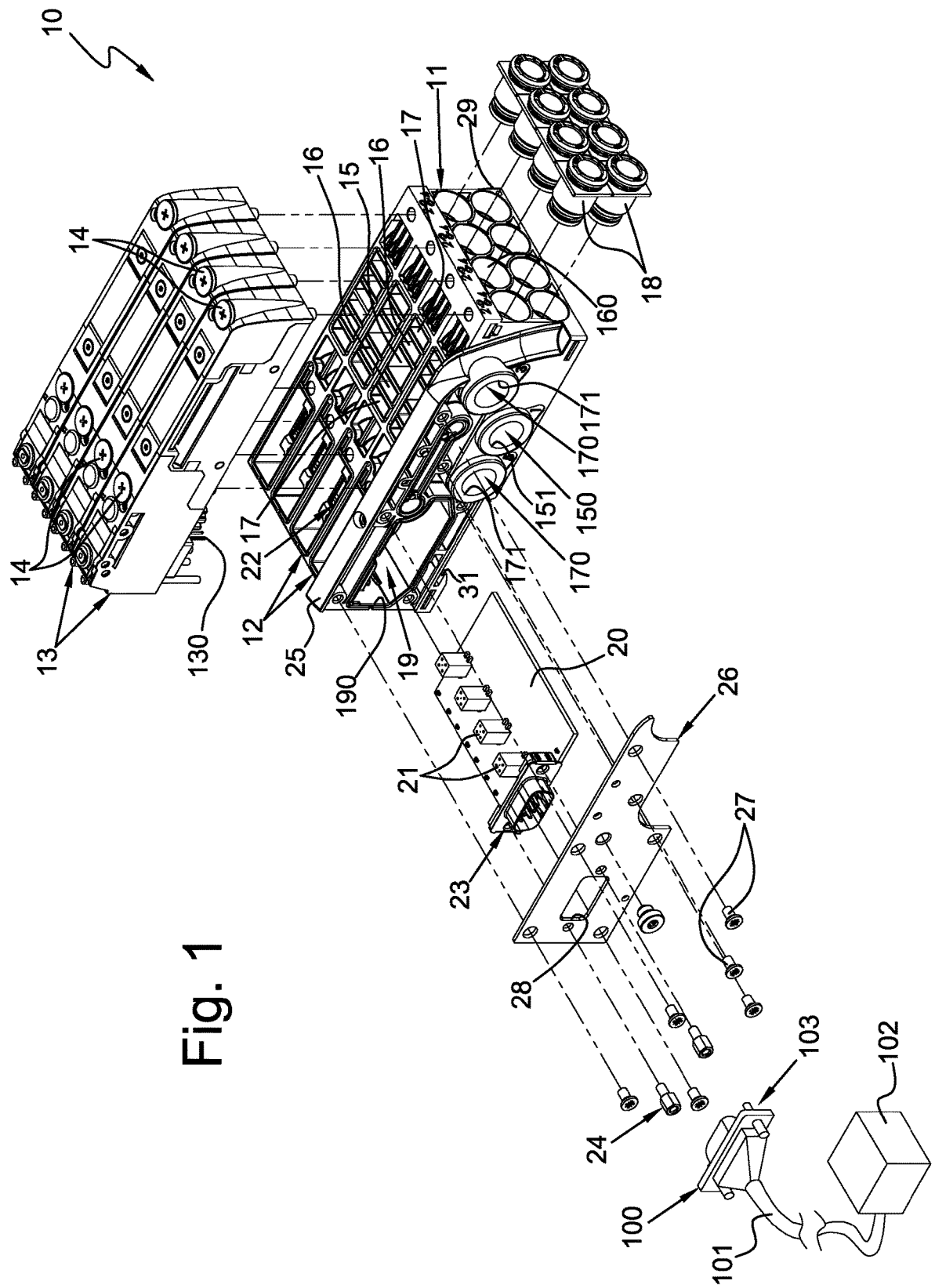
FIG. 1 is an axonometric and exploded view of a solenoid valve island according to the present disclosure.
Figure 2:
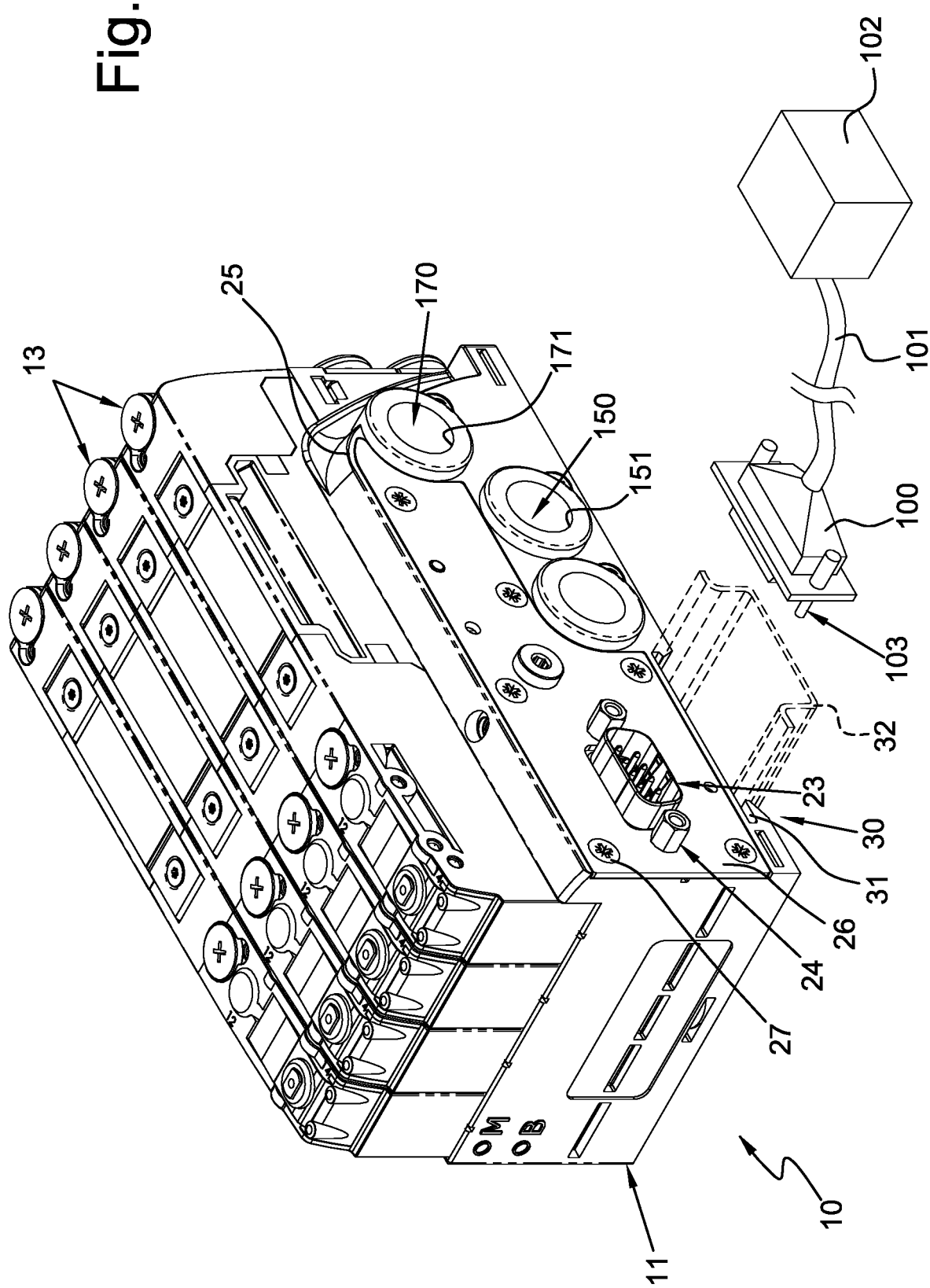
FIGS. 2 and 3 are axonometric views, respectively front and back, of the solenoid valve island in FIG. 1.
Figure 3:
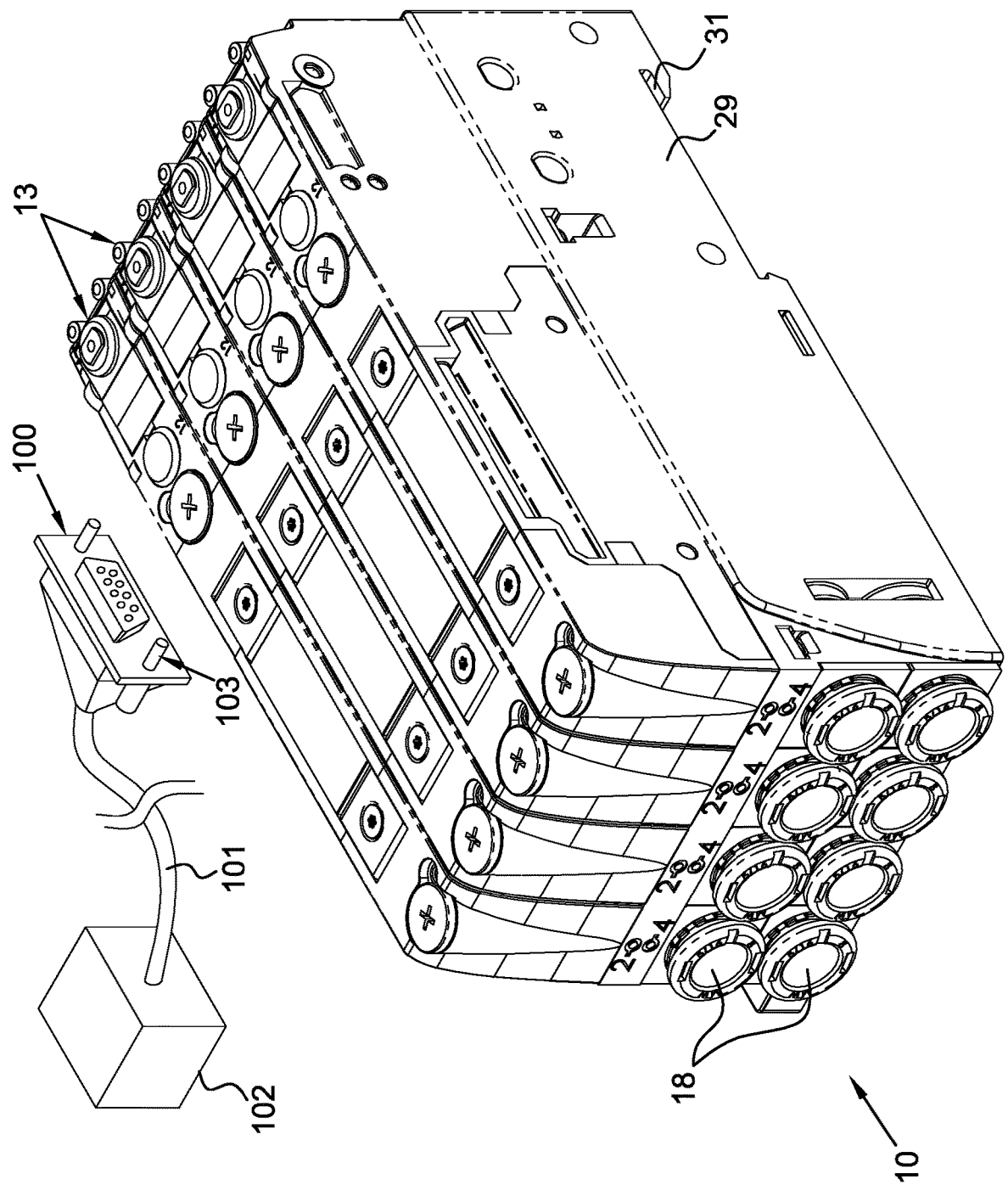
Figure 4:
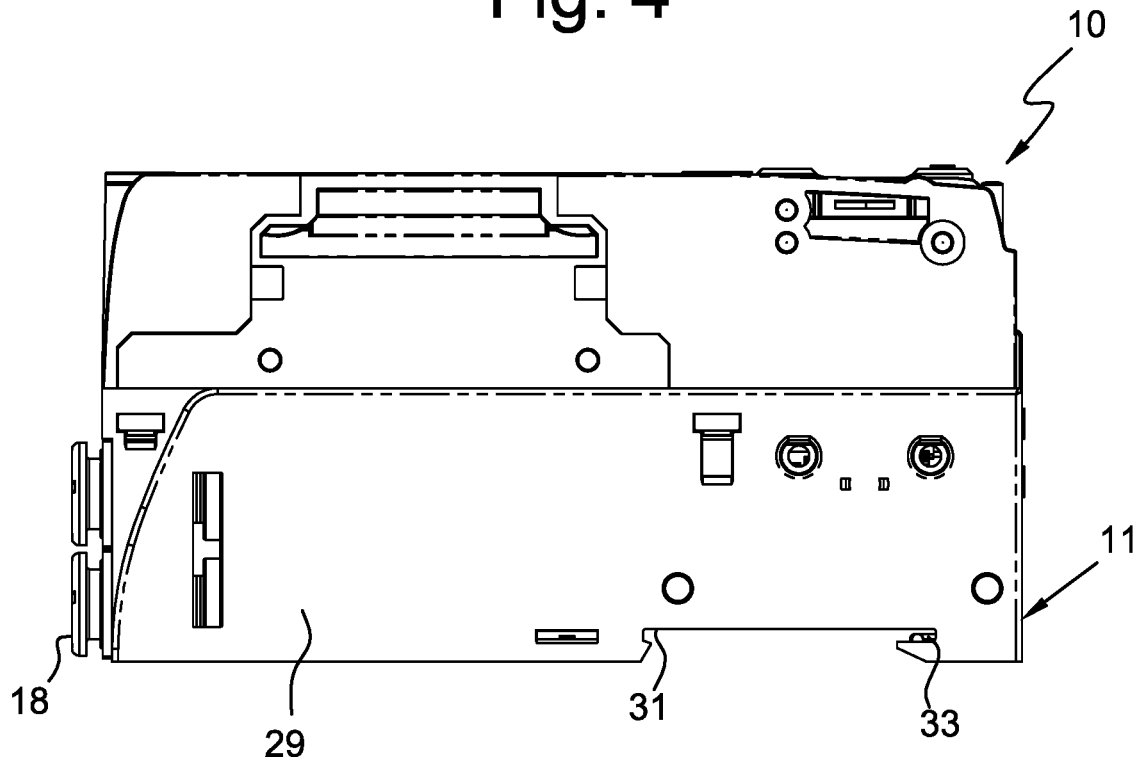
FIGS. 4 and 5 are respectively back and front views of the solenoid valve island in FIG. 1.
Figure 5:
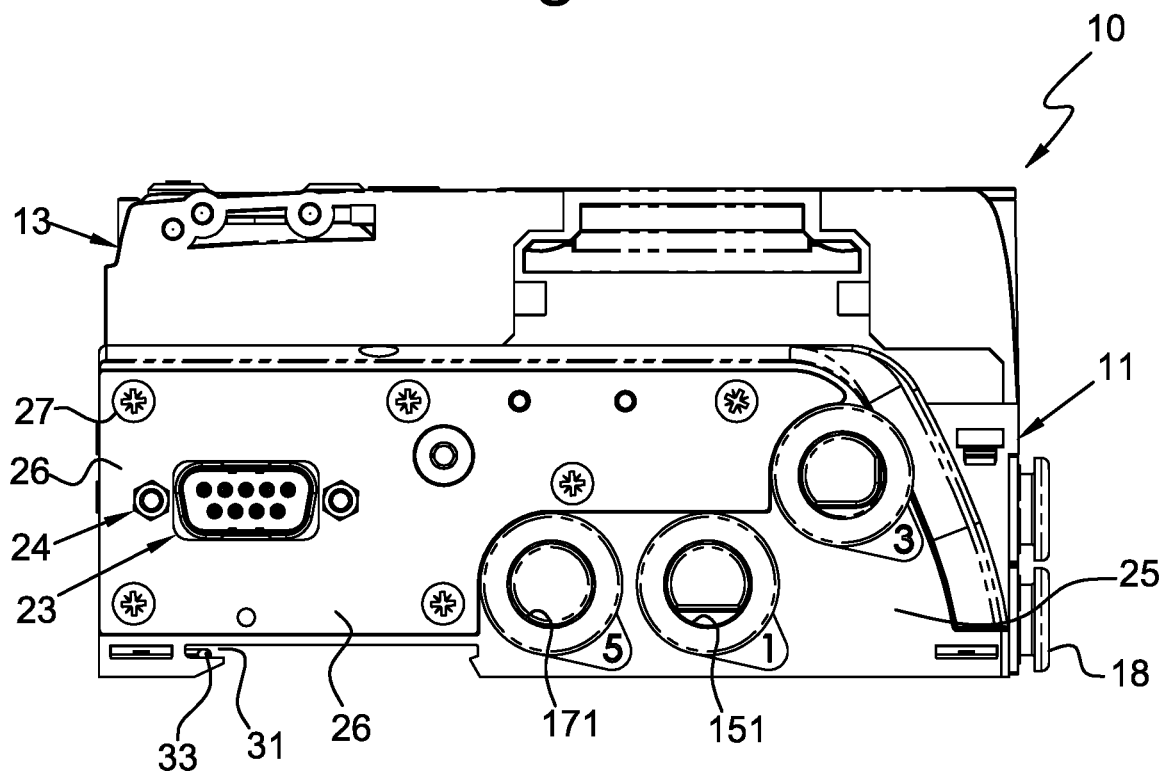

With reference to the figures, a solenoid valve island is shown, indicated overall with reference number 10.

The island 10 comprises a base body 11 in which one or more housings 12 are obtained, each for a respective solenoid valve 13.

The solenoid valves 13 are of known type and, for this reason, they are not further described.

Each solenoid valve 13 can be coupled to the base body 11 at a respective housing 12 by means of removable fixing members such as for example, screws 14.

Each housing 12 is provided with ducts for the passage of the fluid under pressure, said ducts are made in the base body 11 and are connected with the corresponding mouths of the respective solenoid valve 13. In particular, each housing 12 made in the base body 11 is provided with: at least one feeding duct 15, at least one outlet or delivery duct 16 and at least one discharge duct 17, which are connected respectively with a corresponding feeding mouth, a corresponding usage or outlet mouth and with a discharge mouth of the respective solenoid valve 13.

Main feeding and collection ducts of the fluid under pressure are also obtained in the base body 11, which join in fluid communication with each housing 12, respectively with the at least one feeding duct 15 and with the at least one discharge duct 17 of each housing 12.

In particular, in the base body 11 there are obtained:

at least one main feeding duct 150 that is in fluid communication with each housing 12, in particular with the at least one feeding duct 15 of each housing 12, for supplying compressed air entering the respective solenoid valve 13, at least one main collection duct 170 that is in fluid communication with each housing 12, in particular with the at least one discharge duct 17 of each housing 12, for collecting the air leaving the respective solenoid valve 13.

The at least one main feeding duct 150 is provided with an inlet mouth 151 for the connection with a source of compressed air (not illustrated).

The at least one main collection duct 170 is provided with a discharge mouth 171 for discharging the air collected.

The outlet ducts 16 of each housing 12 are separate from the outlet ducts 16 of the remaining housings 12 and each leads into a respective delivery mouth 160 in which fittings 18 can be inserted for the connection with a respective utility (not illustrated).

At least one hollow seat 19 is also obtained in the base body 11, in which an electric or electronic supply and control circuit of the solenoid valves 13 is housed.

The electric or electronic supply and control circuit of the solenoid valves 13 may be made on a board 20.

The electric or electronic supply and control circuit of the solenoid valves 13 comprises a plurality of contacts 21 for the electrical connection with a respective solenoid valve 13.

The contacts 21 are for example made on projections made on the board 20.

In order to allow the electrical connection between each solenoid valve 13 and the electric or electronic supply and control circuit, the hollow seat 19 comprises at least one opening 22 at each housing 12. The opening 22 of each housing 12 allows the electrical connection of the respective solenoid valve 13 with the electric or electronic supply and control circuit housed in the base body 11; each opening 22 allows the coupling, through it, of the contacts 21 with corresponding contacts 130 of the respective solenoid valve 13.

According to the present disclosure, the electric or electronic supply and control circuit (board 20) comprises a power supply and signal transmitting connector 23 of the male or female type and that can be coupled with a corresponding end connector 100 (respectively female or male) of a cable 101 for the connection of the electric or electronic supply and control circuit (board 20) to a remote supply and control unit 102.

The connector 23 can be directly coupled with the end connector 100.

The connector 23 is configured to supply the electric or electronic circuit (board 20) and to transmit signals between the remote supply and control unit 102 and the electric or electronic circuit, the signals being control signals and being capable of including also diagnostic data.

If the electric or electronic supply and control circuit is made on a board 20, the connector 23 is mounted on the board 20. In particular, the connector 23 is fixed to one end of the board 20. Even more particularly, the connector 23 is mounted on the board 20 so as to extend on a plane that is substantially orthogonal to the one of the board 20, thus making a substantially "L"-shaped structure.

The connector 23 is also provided with its own fixing elements 24 adapted to be removably coupled with corresponding fixing elements 103 of the corresponding end connector 100.

The fixing elements 24 of the connector 23 and the corresponding fixing elements 103 of the corresponding end connector 100 may be, for example, of the screw type.

In the embodiment shown in the accompanying figures:
the connector 23 and the corresponding end connector 100 are of the known "cup connector" type (D-subminiature) with a plurality of pins;
the connector 23 is of the male type and the corresponding end connector 100 is of the female type;
the fixing elements 24 comprise so-called "towers" in which threaded holes are obtained in which corresponding screws forming the fixing elements 103 of the end connector 100 are engaged and can be moved from the outside by means of respective grips.

In order to allow the access to the connector 23 from the outside of the island 10, the hollow seat 19 comprises an opening 190 that leads to a first wall 25 of the base body 11 and at which the connector 23 is arranged.

A cover element 26 is removably mounted on the base body 11, for example by means of screws 27, to cover the opening 190.

The cover element 26 has a window 28 through which the connector 23 faces towards the outside of the base body 11.

The cover element 26 is in the form of a reduced thickness (in the range of a few mm) plate or sheet.

In a preferred embodiment, the first wall 25 is opposite to a second wall 29 of the base body 11.

The first wall 25 and the second wall 29 are substantially parallel to each other.

The housings 12 are made in sequence one after the other between the first wall 25 and the second wall 29; the ends of the feeding ducts 15, of the discharge ducts 17 and of the outlet ducts 16 of each housing 12 that join at the respective feeding, discharge and outlet mouths of the corresponding solenoid valve 13 are aligned in a row along directions that are parallel to the first wall 25 and to the second wall 29. The at least one opening 22 of each housing 12 is also aligned in a row along such directions.

Each housing 12 has a maximum width A measured along a direction that is substantially orthogonal to the first wall 25.

The main feeding duct 150 and the main collection duct 170 extend between the first wall 25 and the second wall 29 in directions that are substantially orthogonal thereto.

Each main feeding duct 150 and each main collection duct 170 is blind; the end thereof, respectively opposite to the inlet mouth 151 and to the discharge mouth 171, is closed.

Each main feeding duct 150 and each main collection duct 170 in practice comprises a respective blind hole that is made in the base body 11 and the longitudinal axis of which extends orthogonal to the first wall 25 and to the second wall 29.

Essentially, the main feeding duct and each main collection duct 170 do not cross the main body 11 from the first wall 25 to the second wall 29, leading to each of them, rather they only lead to the first wall 25 respectively with the inlet mouth 151 and the discharge mouth 171.

The second wall 29 is continuous, not having openings at the main feeding duct and of each main collection duct 170.

The hollow seat 19 also has a blind bottom; that is the end thereof opposite to the access opening 191 is closed.

The hollow seat 19 has a mainly longitudinal development that extends between the first wall 25 and the second wall 29.

The hollow seat 19 is made beside the main feeding 150 and collection 170 ducts.

The second wall 29 therefore is continuous, that is its thickness is not crossed by the main feeding 150 and collection 170 ducts, nor by the hollow seat 19.

The base body 11 overall has the shape of a substantially straight parallelepiped, less any rounding and bevels of edges, of optional resting and fixing feet to a support structure or of reliefs such as for example, collars that surround the inlet 151 and outlet 171 mouths.

Figure 8:
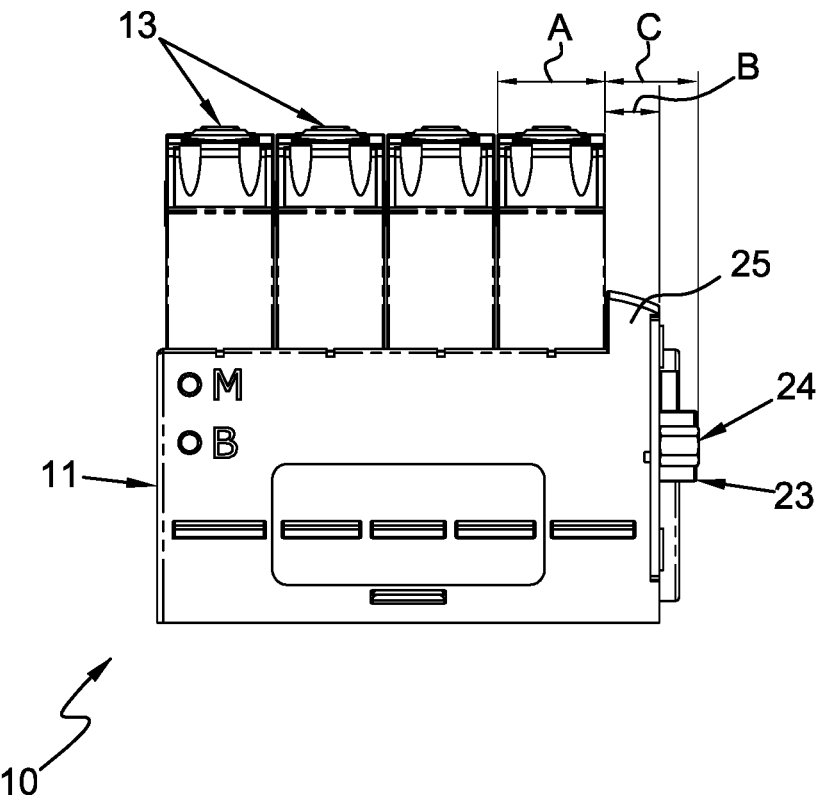
FIGS. 8 and 9 are opposite side views of the solenoid valve island in FIG. 1.
Figure 9:
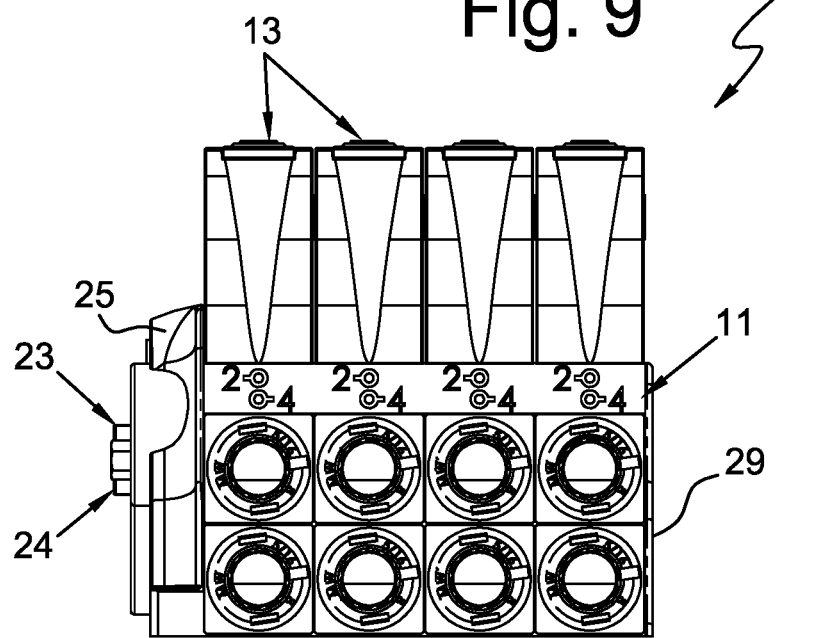
Figure 10:
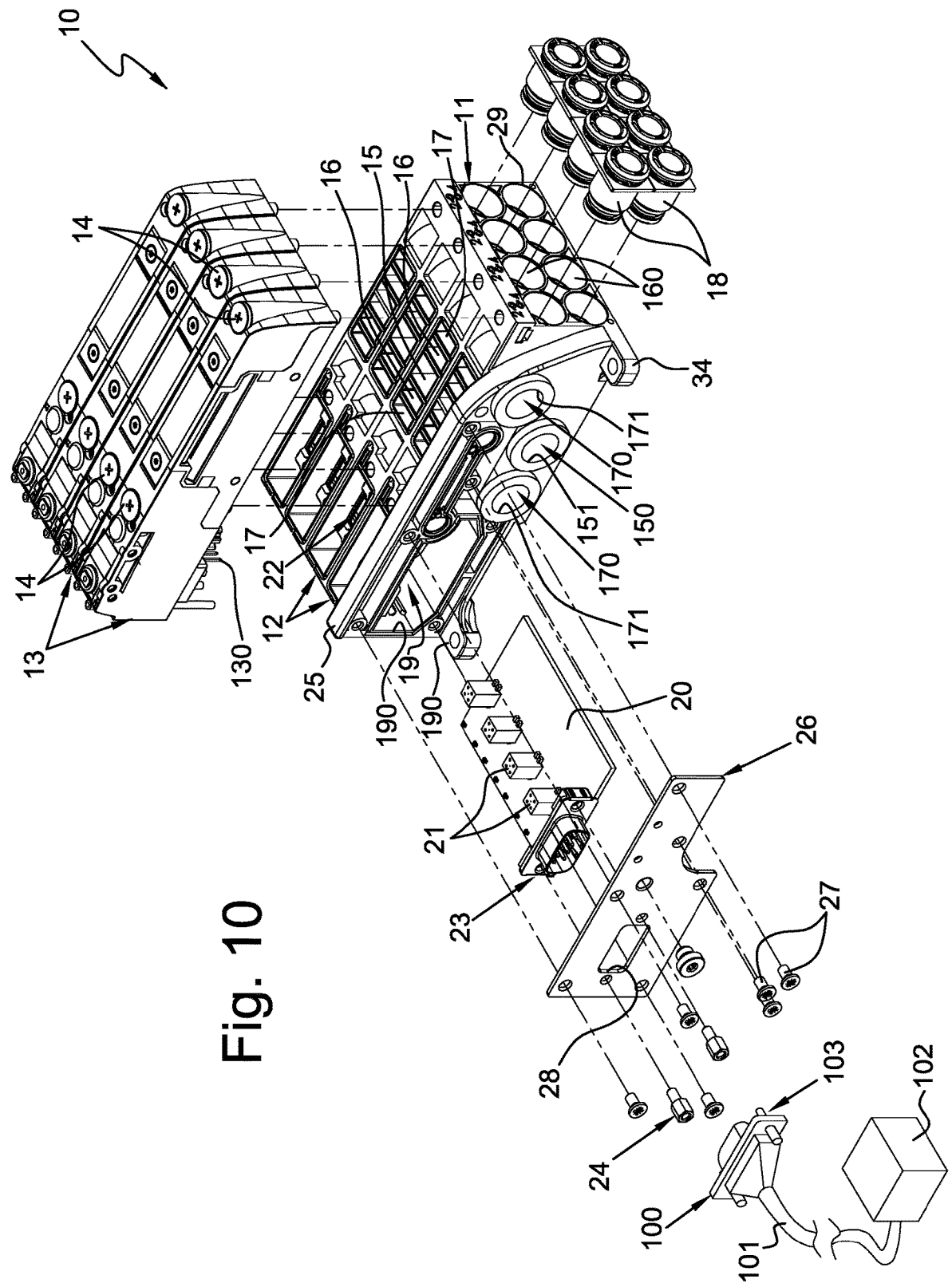
FIGS. 10, 11 and 12 are views like the ones in FIGS. 1, 2 and 3, of a possible alternative embodiment of the solenoid valve island according to the present disclosure.
Figure 11:
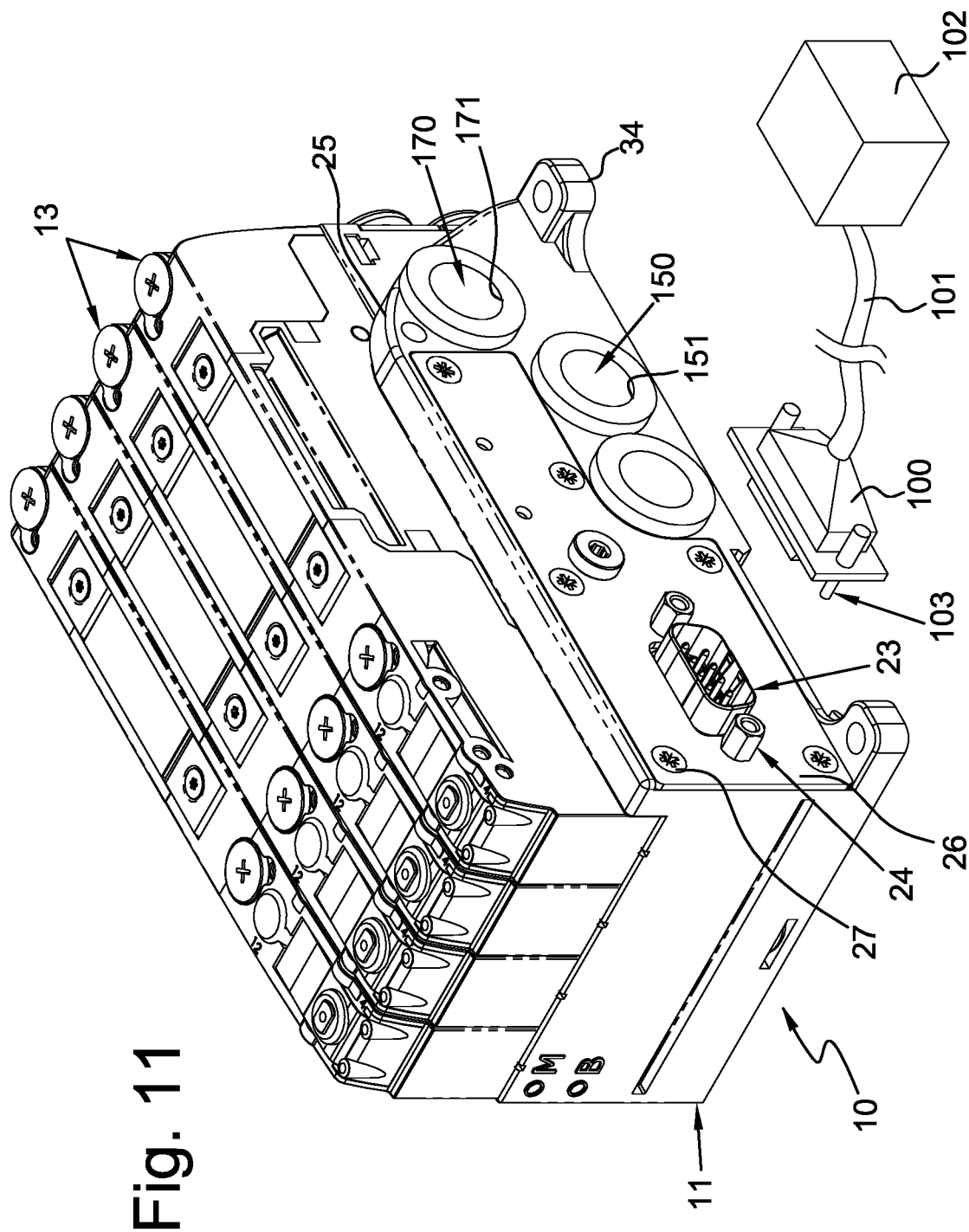
Figure 12:
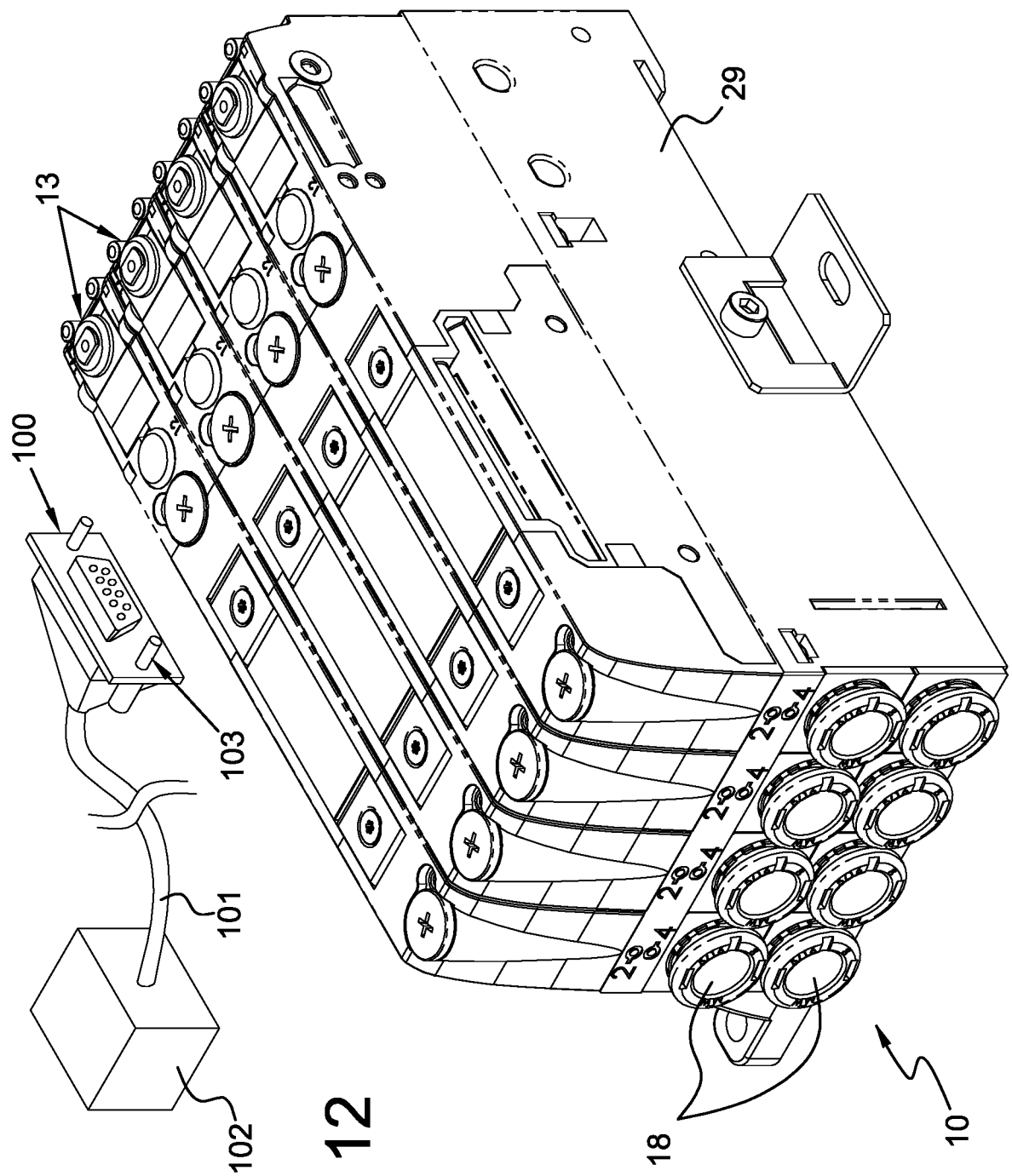

As shown in FIG. 8, the maximum thickness B of the first wall 25 is less than the maximum width A of each housing 12; the connector 23 is chosen and arranged in such a manner whereby the sum of the maximum thickness B of the first wall 25 and of the portion of the connector 26 that projects cantilevered therefrom (indicated as a whole with C) is less than the maximum width A of each housing 12.

The base body 11 is advantageously made in one piece.

The base body 11 is advantageously made in one piece, in a single body made of polymeric material (techno-polymer) obtained for example, by molding.

In a preferred embodiment (FIGS. 1 to 9), the base body 11 does not have fixing feet that project cantilevered from one or more of the side walls thereof, which allows the overall volumes thereof to be contained.

In this case, the base body 11 may be provided with fixing members 30 to a support structure that are obtained at the lower wall thereof, without projecting from the side walls thereof.

The fixing members 30 may for example comprises a housing 31 obtained in the lower wall of the base body 11 and in which a coupling plate 32 having an omega-shaped cross section (see FIG. 6) can be inserted. The coupling plate 32 is retained stationary in position by a spring 33 interposed between a side thereof and a back of the housing 31. The portion of the coupling plate 32 that projects at the bottom of the lower wall of the base body 11 can be inserted in a corresponding housing obtained in the support structure and not shown in the accompanying figures.

Alternatively, the base body 11 may be provided with seats in which fixing feet comprising separate elements can be inserted. In any case, the possibility is not excluded for the base body 11 to be provided with fixing feet 34 that project cantilevered from the side walls thereof, as shown in FIGS. 10 to 13.

The island 10 may in itself form a solenoid valve island of the non-modular type or may be used as head module of a solenoid valve island of modular type. In this last case, the base body 11 is constrained in known manner (for example, with screws or rods) to at least one modular base body (not illustrated in the accompanying figures) provided with at least one respective housing for a corresponding solenoid valve and electrical and pneumatic connections to the base body 11 and to possible subsequent modular base bodies.

The solenoid valve island according to the present disclosure has the advantage of having overall contained volumes with respect to known solenoid valve islands, both of the modular and of the non-modular type, the sizes of the respective housings for solenoid valves being equal.

Such reduction, which is equal to about 30%, is a consequence of having arranged the electrical power supply and signal transmission connector coupling with the corresponding end connector of the cable connecting with the remote supply and control unit inside the base body, and not instead in a separate element or module mounted or coupled to the base body.

The elimination of the electrical connection element or module as separate element mounted or coupled to the base body evidently also results in a reduction of the production costs and a simplification of the overall structure of the solenoid valve island and of the assembly operations thereof.

According to the present disclosure, the base body is configured to contain therein both the pneumatic connections (i.e. the main feeding and collection ducts) and all the electrical supply and control connections required for the operation of the island, intending with this both the electric or electronic supply and control circuit of the solenoid valves and the signal supply and transmission connector for the connection of such circuit with a remote supply and control unit.

The base body therefore comprises a single block.

Making the base body as a single body obtained for example by molding of plastic material allows further reducing the production costs (up to about 40%), in particular with respect to known solenoid valve islands of non-modular type. The base body of the latter is indeed generally obtained by extruding aluminum and is crossed by through holes that define the main feeding and collection ducts. An end of the latter must necessarily be closed with specific caps, with evident disadvantages in terms of complication and overall costs of the solenoid valve island.

According to the present disclosure, a wall of the base body may instead be made as a continuous wall (that is, without through openings and completely closed). In particular, in the case in which the access opening to the hollow seat for containing the electric or electronic supply and control circuit is obtained in the same first wall to which the inlet and discharge mouths of the main feeding and collection ducts lead, it is possible to make the wall opposite thereto (second wall) like a continuous body without through openings and completely closed.

Finally, it is clear that the solenoid valve island as conceived is susceptible to numerous modifications and variants, all falling within the scope of the disclosure; moreover, all the details can be replaced by technically equivalent elements. In practice, the materials used, as well as their dimensions, can be of any type according to the technical requirements.

The invention claimed is:

1. A solenoid valve island comprising a base body that comprises:
   at least one housing for a respective solenoid valve,
   at least one main feeding duct that is in fluid communication with said at least one housing to supply compressed air entering said solenoid valve, wherein said at least one main feeding duct is provided with an inlet mouth for connection with a source of compressed air,
   at least one main collection duct that is in fluid communication with said at least one housing to collect the air leaving said solenoid valve, wherein said at least one main collection duct is provided with a discharge mouth for discharging the air collected,
   at least one hollow seat in which an electric or electronic supply and control circuit of said solenoid valve is housed, wherein said hollow seat comprises at least one opening at said at least one housing for an electric connection, through said at least one opening, of said at least one solenoid valve with said electric or electronic supply and control circuit,
   wherein said electric or electronic supply and control circuit comprises a power supply and signal transmitting connector of male or female, said connector is at least partially housed in said seat of said base body and is coupleable with a corresponding end connector of a cable for the electric connection of said electric or electronic supply and control circuit to a remote supply and control unit, said corresponding end connector being respectively female or male.

2. The solenoid valve island according to claim 1, wherein said power supply and signal transmitting connector is provided with its own fixing elements adapted to be removably coupled with corresponding fixing elements of said corresponding end connector.

3. The solenoid valve island according to claim 1, wherein said base body comprises a first wall at which an access opening to said hollow seat is obtained and at which said power supply and signal transmitting connector is arranged.

4. The solenoid valve island according to claim 3, wherein said base body comprises a second wall opposite to said first wall, wherein said at least one main feeding duct, said at least one main collection duct and said hollow seat extend between said first wall and said second wall, wherein said inlet mouth and said discharge mouth are obtained in said first wall.

5. The solenoid valve island according to claim 3, further comprising a cover element that is removably mounted on said base body at said access opening to cover said access opening, and a window through which said power supply and signal transmitting connector faces towards the outside of said base body.

6. The solenoid valve island according to claim 4, wherein a maximum thickness of said first wall is less than a maximum width of said at least one housing measured along a direction that is orthogonal to said first wall.

7. The solenoid valve island according to claim 4, wherein a maximum thickness of said first wall, comprehensive of a portion of power supply and signal transmitting connector protruding therefrom, is less than a maximum width of said at least one housing measured along a direction that is orthogonal to said first wall.

8. The solenoid valve island according to claim 1, wherein said base body comprises a single body made of polymeric material.

9. The solenoid valve island according to claim 4, wherein said at least one main feeding duct and said at least one main collection duct are blind.

10. The solenoid valve island according to claim 1, wherein said base body comprises fixing members that are obtained at a lower wall thereof.

11. The solenoid valve island according to claim 1, further comprising at least one modular base body provided with at least one respective housing for a respective solenoid valve, and wherein the housing can be removably coupled to said base body, said base body forming a head module of said island.

* * * * *